C. F. BURGESS.
BATTERY WRAPPER.
APPLICATION FILED AUG. 15, 1917.
1,284,584.
Patented Nov. 12, 1918.
2 SHEETS—SHEET 1.
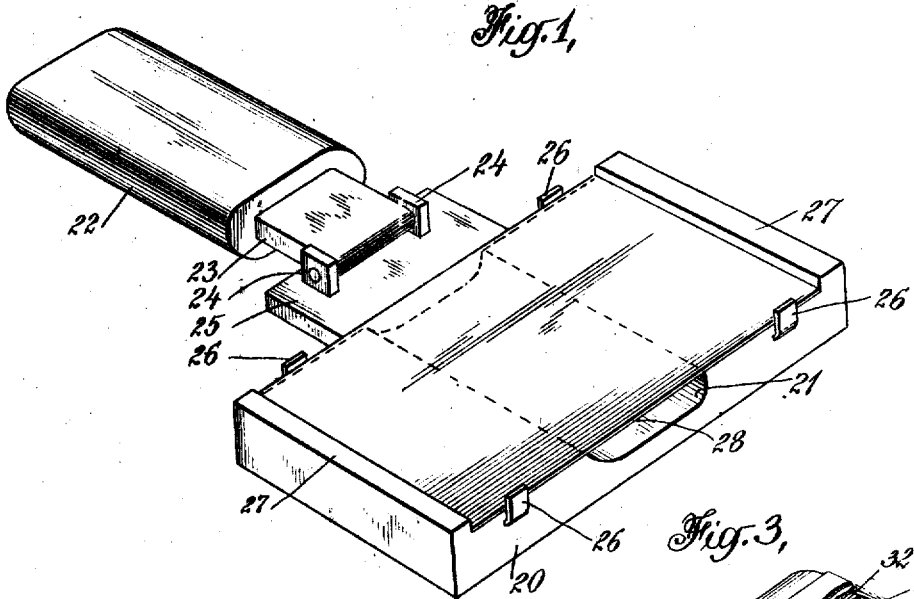
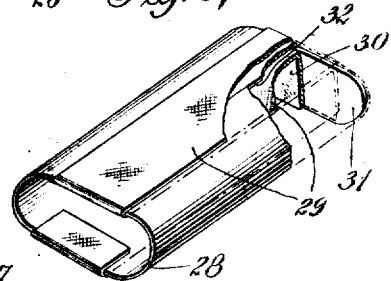
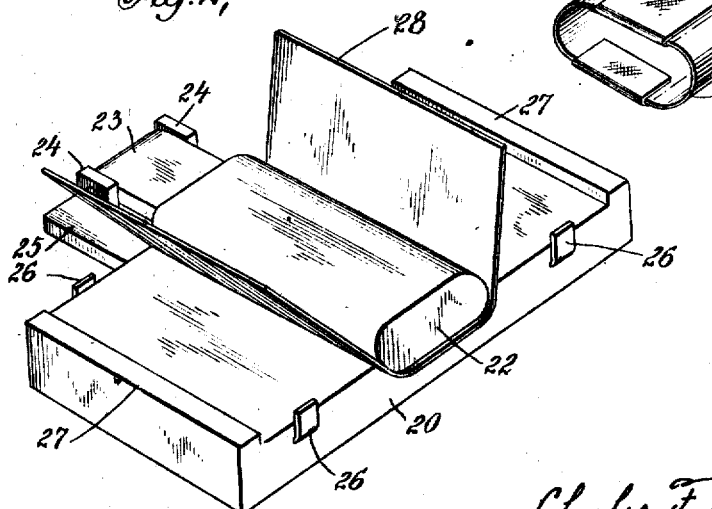
Charles F. Burgess, Inventor
By his Attorneys
Pennie, Davis, Marvin & Edmonds C. F. BURGESS.
BATTERY WRAPPER.
APPLICATION FILED AUG. 15, 1917.
1,284,584.
Patented Nov. 12, 1918.
2 SHEETS—SHEET 2.
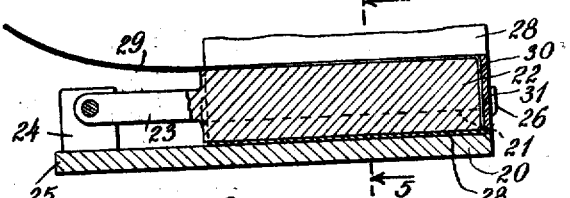
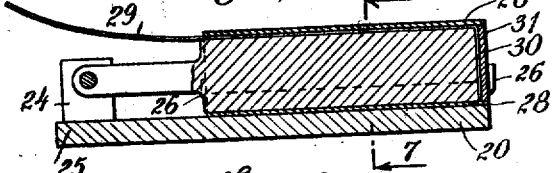
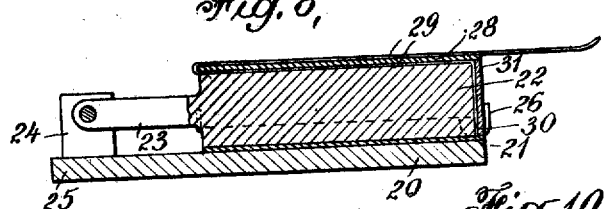
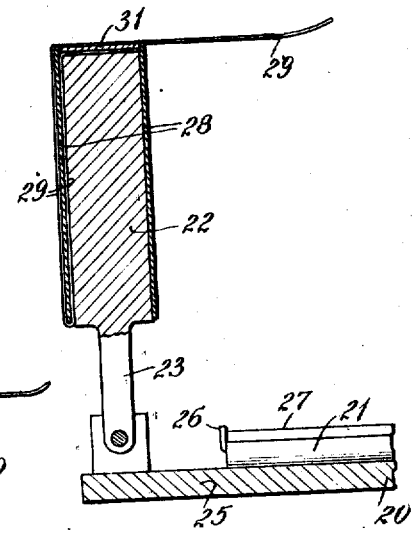
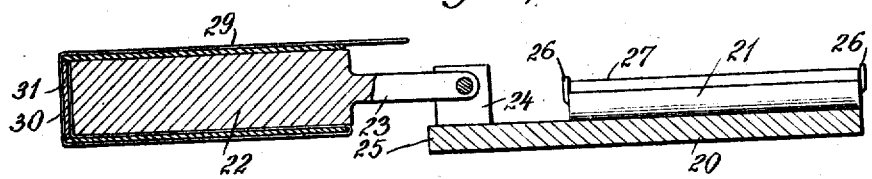
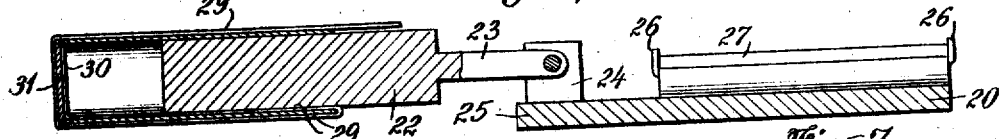
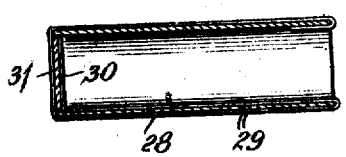
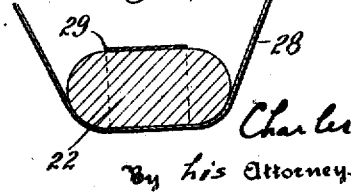
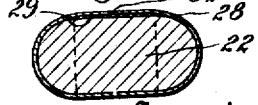
Inventor
Charles F. Burgess.
By his Attorneys
Pennie, Davis, Marvin & Edmonds

UNITED STATES PATENT OFFICE.

CHARLES F. BURGESS, OF MADISON, WISCONSIN, ASSIGNOR TO BURGESS BATTERY COMPANY, A CORPORATION OF WISCONSIN.

BATTERY-WRAPPER.

1,284,584.

Specification of Letters Patent.

Patented Nov. 12, 1918.

Application filed August 15, 1917. Serial No. 186,278.

*To all whom it may concern:*

Be it known that I, CHARLES F. BURGESS, a citizen of the United States, residing at Madison, in the county of Dane, State of Wisconsin, have invented certain new and useful Improvements in Battery-Wrappers; and I do hereby declare the following to be a full, clear, and exact description of the invention, such as will enable others skilled in the art to which it appertains to make and use the same.

The present invention relates to battery wrappers, particularly those adapted to hold the small dry cells which are used in pocket flashlights, although the invention is not limited to wrappers for batteries of small size, for the method of forming the wrappers may be used to produce battery wrappers of any desired size.

It is an object of the invention to provide a simple method of manufacturing battery wrappers by successive operations upon the materials of which the wrappers are formed, these operations comprising, in general, the folding of the sides of the wrapper into the proper form, the fastening of the meeting edges of the wrapper and the attachment of the bottom. The invention also embraces the novel form of article produced by the method referred to above.

Other objects and advantages of the invention will appear more clearly from an explanation of the details of construction of the battery wrappers, and a description of the several steps of the method by which they are formed.

The method of the present invention may be practised conveniently upon a simple apparatus of the construction shown in Figures 1 and 2 of the accompanying drawings, to produce a pattery wrapper as shown, partly in section, in Fig. 3. Figs. 4 to 12, inclusive, show the positions occupied by the apparatus and the materials of which the wrapper is made, during successive steps in the formation of this article. Of the above views Figs. 5 and 7 are sectional views along the lines 5—5 of Fig. 4 and 7—7 of Fig. 6, respectively.

Referring to the drawings and particularly to Figs. 1 and 2, 20 represents a base plate which may be constructed of wood, metal or any other suitable material. This base plate is provided with a central groove 21 of a shape and size corresponding to the shape and size of approximately one-half of the wrapper which is to be formed on the apparatus. A mandrel 22 is adapted to coöperate with the groove and this mandrel has the shape and dimensions of the interior of the wrapper which is to be formed thereon, except that it is a trifle shorter. The mandrel is provided with an extension 23 pivoted to lugs 24 extending upwardly from a shelf 25 projecting from the end of the base plate 20. In order to place the sheet of material of which the wrapper is to be formed in the right position upon the base plate, the latter is provided with guides 26 at its sides and other guides 27 attached to its ends.

In using the apparatus to form a battery wrapper the shelf 25 is placed toward the operator and the mandrel is turned into the position shown in Fig. 1. A sheet of material 28 of the required size is then laid upon the base plate and the mandrel moved into the position shown in Fig. 2 whereupon the paper will be drawn into a position substantially like that shown in this figure. The operator then takes a strip of tape 29 which has been coated with adhesive and moistened and places it upon the top of the mandrel with one end 30 extending over the free end of the mandrel as shown most clearly in Fig. 4. The gummed side of the tape is exposed and to the end portion of the tape is attached an oval bottom 31 which may be of cardboard or any other desired material. Since the mandrel is of slightly less length than the wrapper formed thereon, the material will project over the free end of the mandrel forming a recess of depth just sufficient to receive the bottom. The operator next folds down the edges of the sheet 28 and presses them against the gummed surface of the strip as shown in Fig. 6 and in cross section in Fig. 7, the sheet of material being of such a size that its edges meet at 32 without any overlapping. The tape 29 is next turned over the forward edge of the wrapper and attached to its outer surface as shown in Fig. 8 to assist still further in holding the edges of the sheet together. The next step in the operation consists in swinging the mandrel into an upright position as shown in Fig. 9 and carrying the tape across the bottom of the wrapper. The mandrel is then dropped into the position shown in Fig. 10 and the tape carried along the outside of the sheet. The tape should preferably be cut to such a length that when the last operation is finished a short length of tape will project beyond the open end of the wrapper as shown in Fig. 10. The wrapper is then removed from the mandrel as shown in Fig. 11 and the free end of the strip is folded over the edge of the wrapper and attached to the inside forming the finished article represented in longitudinal section in Fig. 12.

The apparatus and method of using it, as described above, possesses several advantages among which may be mentioned the fact that it permits the wrapper to be built up around the bottom so that it cannot be smaller than the bottom. In the usual process of forming these wrappers the sides of the article are first wrapped and formed into shape and then the bottom is fitted into place. It frequently happens that the bottom is thus put in at an angle, a good joint cannot be obtained and the resulting article is not of correct size to hold the batteries. The present construction has the further advantage that the bottom is supported on both sides, that is, by the end of the tape which is attached to its inner face as well as the portion of the tape passing over the outer face of the bottom. In other types of construction the bottom is held in place from one side only. Furthermore the edges of the sides of the wrapper are held together by a strip of tape on each side making a good butt joint instead of a lap joint, which not only strengthens the article by permitting the tape to be attached to both the inside and the outside of the material, but also produces a wrapper which will be of uniform shape without the ridge that would be caused if a lap joint were used. The tape around the entire wrapper acts as a reinforcement, which effect is increased by the fact that the tape is turned over portions of the outer edges of the wrapper which prevents tearing of the latter when the cells are inserted. While the wrapper shown and described above has been finished by turning the free end of the tape within the wrapper, this end may be left in the condition shown in Figs. 10 and 11 and after the cells have been assembled in the wrapper this free end may be carried across the top of the cells and attached to the opposite side of the wrapper thus forming a seal for the cells as well as an insulator for any electrical connectors which may be attached to the end of the battery.

It will be understood that the battery wrappers of the present invention may be made upon other forms of apparatus than that shown herein, and also that various features of the method and various details of the product may be altered without departing from the principle of the invention. In my co-pending application, Serial No. 186277, filed August 15, 1917, claims are made on novel features of the apparatus herein disclosed and in my application, Serial No. 222,585 filed March 15, 1918, as a division of the present application, claims are made on the method of making battery wrappers above described.

I claim:

1. A battery wrapper a longitudinal joint of which is reinforced both inside and outside with an adhering strip and the bottom of which is held in place by the strip.

2. A battery wrapper having adjacent longitudinal edges held together both inside and outside by an adhering strip and a bottom held in place by the strip.

3. A battery wrapper having abutting longitudinal edges, a bottom set within one end of the wrapper, and a strip of adhering material holding the abutting edges together and carried over both sides of the bottom to hold it in place.

4. A battery wrapper having adjacent edges, a bottom set within one end of the wrapper and having its outer surface flush with the end of the wrapper, a strip of adhesive material passing along the inside of the wrapper and thence along the outside thereof for holding the edges together and being carried over the outside of the bottom and thence along the outside of the wrapper on the other side thereof.

5. A new article of manufacture comprising an oval shaped wrapper the adjacent edges of which are held together by adhering tape and a bottom for the article held in place by the inner end of the tape and also by a portion thereof which is laid along the outside of the wrapper and across the outside of the bottom.

6. A battery wrapper comprising a casing having longitudinaly edges reinforced both inside and outside with adhering tape, and a bottom held in place by the tape on both the inner and outer faces of the bottom.

7. A battery wrapper comprising a casing having longitudinal edges reinforced both inside and outside with adhering tape and a bottom held in place by the tape on both the inner and outer faces of the bottom, said tape being carried along the outside of the casing on the side thereof opposite its edges.

8. In a battery wrapper, a strip of adhering tape holding together the longitudinal edges of the wrapper and also adhering to both sides of the bottom of the wrapper to hold it in place at one end of the wrapper.

9. A battery wrapper comprising a casing having longitudinal edges reinforced both inside and outside with adhering tape and a bottom secured to a part of the tape on the inside of the wrapper, and also secured to a part of the tape on the outside of the wrapper, said tape being carried along the outside of the casing opposite the longitudinal edges and having its end folded over the edge of the wrapper and stuck down on the inside thereof substantially as described.

In testimony whereof I affix my signature.

CHARLES F. BURGESS.